United States Patent [19]
Sasaki et al.

[11] 3,971,124
[45] July 27, 1976

[54] METHOD FOR MANUFACTURING CYLINDRICAL ARMATURE

[75] Inventors: Shigeru Sasaki, Katsuta; Kiichi Nakamura, Hitachi, both of Japan

[73] Assignee: Hitachi, Ltd., Japan

[22] Filed: Sept. 5, 1975

[21] Appl. No.: 610,783

[30] Foreign Application Priority Data
Sept. 13, 1974   Japan.............................. 49-105048

[52] U.S. Cl.................................. 29/598; 156/172; 156/173; 156/267; 264/159
[51] Int. Cl.²........................................ H02K 15/10
[58] Field of Search...................... 29/598; 264/159; 156/172, 173, 187, 267; 310/43, 266

[56] References Cited
UNITED STATES PATENTS

| | | | |
|---|---|---|---|
| 2,759,116 | 8/1956 | Glass............................. | 29/598 UX |
| 3,623,220 | 11/1971 | Chase et al. ......................... | 29/598 |
| 3,737,354 | 6/1973 | Hattori............................ | 156/267 X |
| 3,831,267 | 8/1974 | Onishi et al........................... | 29/598 |

FOREIGN PATENTS OR APPLICATIONS

4442/69   12/1964   Japan.................................... 29/598

*Primary Examiner*—Carl E. Hall
*Attorney, Agent, or Firm*—Craig & Antonelli

[57] ABSTRACT

A method for manufacturing a cylindrical armature having an armature winding arranged cylindrically and a cylindrical insulating layer formed at least on the outer peripheral surface of the cylindrical armature winding by winding an insulating material impregnated with thermosetting resin is disclosed. The insulating material is wound over the armature winding and on a jig adapted to be separated into an effective part corresponding to the cylindrical armature winding and a remaining ineffective part. After hardening the resin, the part of the insulating layer on the ineffective part is separated, together with the jig, from the effective part.

2 Claims, 4 Drawing Figures

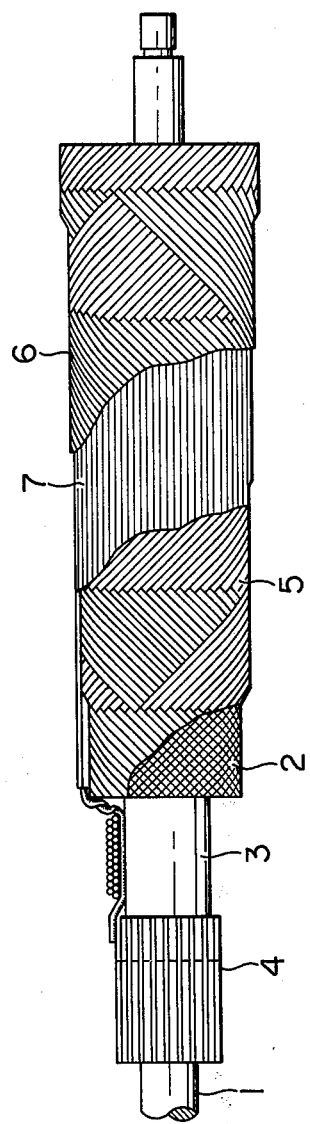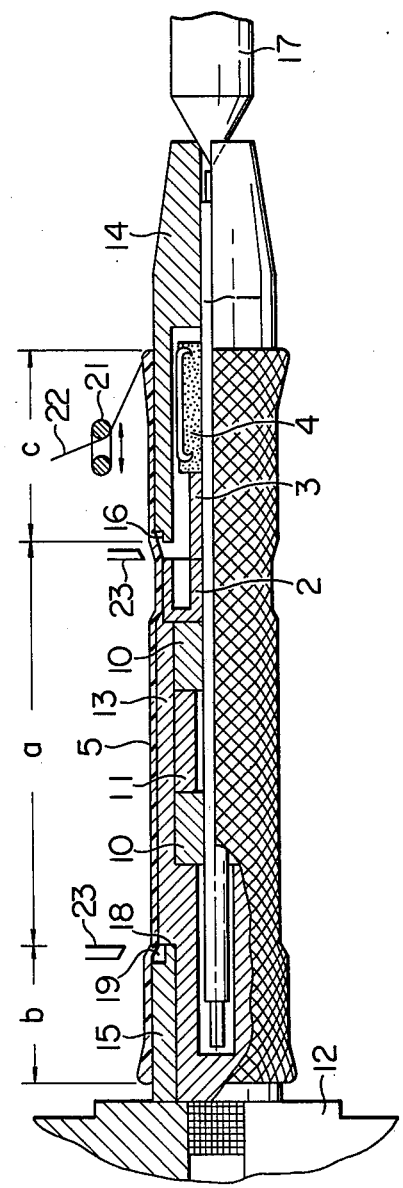

METHOD FOR MANUFACTURING CYLINDRICAL ARMATURE

BACKGROUND OF THE INVENTION

1. Field of the Invention

This invention relates to a method for manufacturing a cylindrical armature used in a low-inertia DC motor or the like.

2. Description of the Prior Art

In a conventional cylindrical armature of this type, an armature winding is arranged cylindrically and glass tapes for the dual purpose of insulation and reinforcement for transmission of torque generated in the armature winding to the armature shaft are wound on the outer and inner peripheral surface of the cylindrical armature winding and then hardened with resin.

The insulating layer formed by the glass tape, however, is unable to protect the armature sufficiently from the torsional forces generated when the armature is rotating.

An alternative conventional method is also proposed in which a glass filament impregnated with resin is uniformly wound spirally to form an insulating layer. In forming such an insulating layer of glass filament, the glass filament is uniformly wound on the inner and outer peripheral surfaces of the cylindrical armature winding in continuous reciprocation in the direction of the axis of the winding, resulting in an undesirable unevenness of the glass filament occurring at the longitudinal turning points.

The presence of such an unevenness of the insulating material on the outer peripheral surface of the cylindrical winding increases the thickness of the side wall of the cylindrical armature. This unnecessarily enlarges the gap between the armature and the stator, thus deteriorating the motor performance.

According to another conventional method for overcoming the above-mentioned shortcoming, the glass filament is wound also on the part of the armature winding other than the effective part thereof to attain a uniform thickness of the insulating layer, in such a manner that the turning points of winding of the glass filament are situated at that extraneous part, thus achieving a uniform thickness of the effective part of the insulating layer.

In the last-mentioned method, however, the insulating layer of the glass filament is inevitably and undesirably wound on the outer peripheral surface of a commutator firmly fitted on the shaft as well as on the shaft itself. This requires a special post-treatment for removal of the undesirable portion of the insulating layer which is disadvantageous for working labor efficiency.

SUMMARY OF THE INVENTION

Accordingly, it is an object of the present invention to provide a method for manufacturing an armature in which an insulating layer is uniformly and accurately formed at least on the outer peripheral surface of the cylindrical armature winding and the removal of the ineffective part of the insulating layer is facilitated.

In order to achieve the above-mentioned object, the present invention has a main feature that the insulating layer to be formed at least on the outer peripheral surface of the cylindrical armature winding is arranged over the armature winding and on a jig which is adapted to be separated into an effective part corresponding to the cylindrical armature winding and the remaining ineffective part, and that after resin-molding the insulating layer, its ineffective part is separated from the effective part together with the jig.

BRIEF DESCRIPTION OF THE DRAWINGS

FIG. 1 is a partially cut-away front view of the cylindrical armature produced by the method according to the present invention.

FIG. 2 to FIG. 4 are diagrams for explaining the processes of manufacturing the cylindrical armature according to the invention.

DESCRIPTION OF THE PREFERRED EMBODIMENT

Figure 3:
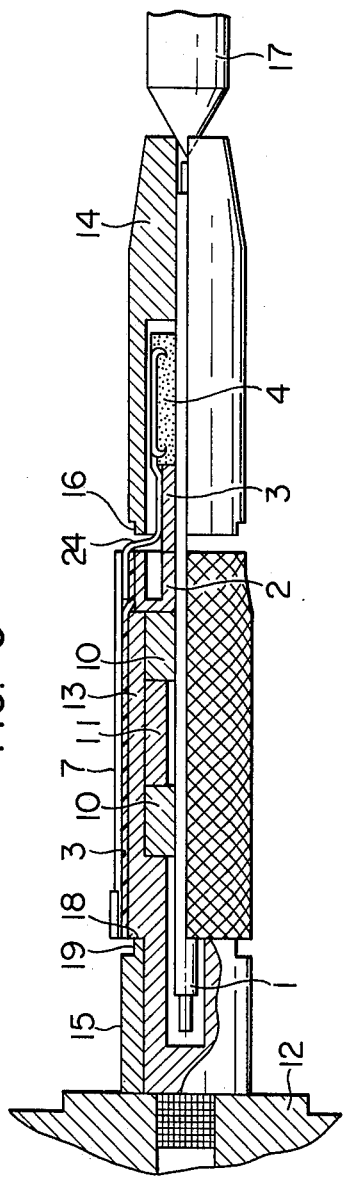

An embodiment of the invention will be described below with reference to the accompanying drawings.

Referring to the front view of FIG. 1, the cylindrical armature fabricated by the method of the invention comprises a shaft 1, a rotor ring 2 firmly fitted on the shaft 1, a collar 3 and a commutator 4. A cylindrical winding 7 insulated and reinforced by an inner cylindrical insulating layer 5 and an outer cylindrical insulating layer 6 is wound on the outer peripheral surface of the rotor ring 2 and on the extension of the surface.

Figure 4:
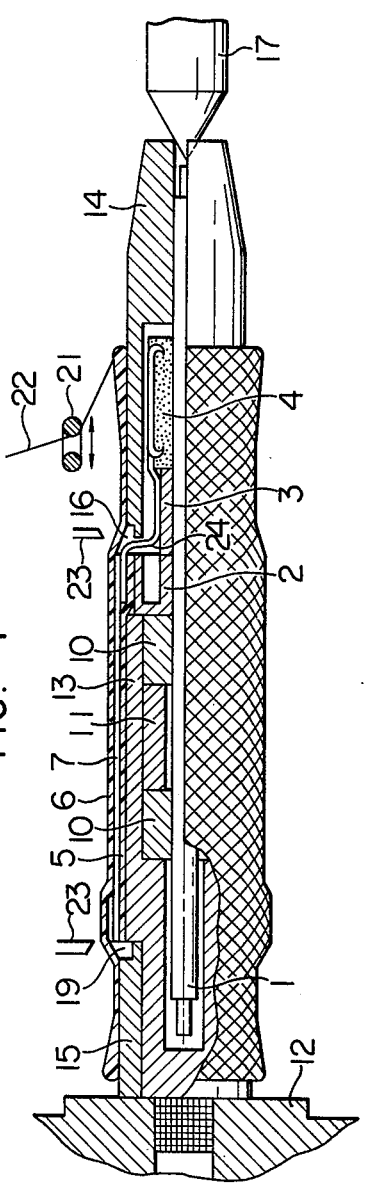

The method according to the invention will be explained below with reference to FIGS. 2 to 4. The shaft 1 on which the rotor ring 2, the collar 3 and the commutator 4 are firmly fitted in advance is inserted into a jig 13 with bushes 10 and a guide 11. One end of the jig 13 is fixed to a chuck 12. The outer peripheral surface of the jig 13 is formed in such a manner that the diameter thereof is equal to the inside diameter of the inner cylindrical insulating layer 5.

Reference numerals 14 and 15 show other jigs arranged on the same axis as the jig 13. The jig 14 covers the whole peripheral surface of the commutator 4 and the collar 3. The jig 14 is provided with a notch at that end of the outer peripheral surface thereof which is opposed in spaced relationship to an axial end of the outer peripheral portion of the rotor ring 2. The other end of the jig 14 is engaged with a center 17 of a winding machine. The jig 15, on the other hand, is located on an offset portion formed at the chuck 12 side of the jig 13, and has a notch 19 in the surface thereof opposed to the trimmed surface 18 of the offset portion.

When the winding machine is operated after inserting the shaft 1 into the jigs 13, 14 and 15, the chuck 12 rotates and at the same time the traverser 21 begins to reciprocate at a fixed speed in the axial direction. The glass filament 22 impregnated with a thermosetting resin is thus wound around the outer peripheral surfaces of the jigs 13, 14 and 15. At the turning points where the reciprocating traverser 21 reverses its direction of movement, the glass filament is laid one on another and likely to develop an unevenness, resulting in the lack of uniformity in the thickness of the insulating layers. For this reason, the traverser 21 is moved over the effective winding length $a$ of the cylindrical winding, plus the ineffective lengths $b$ and $c$ extended in both directions from the extreme ends of the effective length $a$.

After completely winding the glass filament 22 on the jigs 13, 14 and 15, the resin soaked in the glass filament is hardened, and then the effective and ineffective parts of the insulating layer 5 are separated from each other by the use of cutters 23 provided above the notches 16 and 19 at the edges of the effective part $a$ of the cylindrical winding 7, and the jigs 14 and 15 are separated from the jig 13.

In this way, the inner cylindrical insulating layer 5 is formed on the outer peripheral surfaces of the jig 13 and the rotor ring 2 as shown in FIG. 2.

Next, the armature winding 7 is arranged cylindrically on the inner cylindrical insulating layer 5, and the coil tap 24 at the end of the cylindrical winding 7 is connected to the commutator 4. The jigs 14 and 15 are again mounted on the shaft 1 and the jig 13 as shown in FIG. 3. The glass filament 22 is wound around the outer peripheral surfaces of the jig 14, the cylindrical winding 7 and the jig 15 as shown in FIG. 4. The resin soaked in the glass filament 22 is then hardened.

The ineffective part of the insulating layer is cut off from the effective part thereof at the edge notches 16 and 19 of the cylindrical winding 7, and the jigs 14 and 15 are separated from the jig 13. As a result, the outer cylindrical insulating layer 6 of the cylindrical winding 7 is formed.

Finally, the shaft 1 with the collar 3, commutator 4, and the rotor ring 2 together with the assembly of the armature winding 7 and the inner and outer insulating layers 5 and 6 is taken off from the jig 13, whereby the complete cylindrical armature can be obtained.

As described above in detail, the present invention permits the effective part of the insulating layers of an armature to be formed both uniformly and accurately. Further, the ineffective part of the insulating layers is easily removed together with the jigs, thus largely improving the workability of the insulating layers.

We claim:

1. In a method for manufacturing a cylindrical armature comprising the step of forming an insulating layer by uniformly winding a glass filament impregnated with thermosetting resin at least onto the outer peripheral surface of a cylindrically arranged armature winding coupled with a rotor ring firmly fixed on the shaft of the armature, the improvement comprising the steps of mounting on the shaft of the armature a jig adapted to be separated into an effective part corresponding to said cylindrical armature winding and an ineffective part, arranging said cylindrical winding on the outer peripheral surfaces of said effective part of said jig and said rotor ring, winding uniformly said glass filament onto the outer peripheral surface of said cylindrical winding and said ineffective part, hardening said resin to form an insulating layer, and separating the part of the insulating layer on said ineffective part of said jig from the part of the insulating layer on said effective part and removing same, along with said jig, from the armature.

2. A method for manufacturing a cylindrical armature comprising the steps of mounting on the shaft of the armature a jig adapted to be separated into an effective part corresponding to a cylindrical winding of the armature and an ineffective part, winding a glass filament impregnated with thermosetting resin uniformly onto the outer peripheral surfaces of said jig and a rotor ring firmly fixed on the armature shaft, to be coupled with the armature winding, hardening said resin, forming an inner cylindrical insulating layer by removing said glass filament on said ineffective part of the jig together with said ineffective part of the jig, arranging said cylindrical armature winding on said inner cyindrical insulating layer, mounting said ineffective part of the jig again on the armature shaft, winding a glass filament impregnated with thermosetting resin onto the outer peripheral surfaces of said cylindrical armature winding and said ineffective part of the jig to form an outer cylindrical insulating layer, hardening said resin soaked in said glass filament, and separating the part of said insulating layer on said ineffective part of said jig from the part of the insulating layer on said effective part and removing same, along with said jig, from the armature.

* * * * *